United States Patent [19]

Schwärzler

[11] 4,408,139
[45] Oct. 4, 1983

[54] ASYNCHRONOUS LINEAR ELECTRIC MOTOR

[75] Inventor: Peter Schwärzler, Fürstenfeldbruck, Fed. Rep. of Germany

[73] Assignee: Krauss-Maffei AG, Munich, Fed. Rep. of Germany

[21] Appl. No.: 284,575

[22] Filed: Jul. 17, 1981

[30] Foreign Application Priority Data

Aug. 5, 1980 [DE] Fed. Rep. of Germany ....... 3029618

[51] Int. Cl.³ .......................................... H02K 41/00
[52] U.S. Cl. ................................. 310/13; 104/290
[58] Field of Search ........................ 104/290–294; 310/12–14

[56] References Cited

U.S. PATENT DOCUMENTS

| 3,911,828 | 10/1975 | Schwärzler | 310/13 X |
| 4,115,712 | 9/1978 | Guimbal | 310/13 X |
| 4,172,229 | 10/1979 | Guimbal | 310/13 |

Primary Examiner—Donovan F. Duggan
Attorney, Agent, or Firm—Karl F. Ross; Herbert Dubno

[57] ABSTRACT

An asynchronous linear motor in which a stator mounted on a vehicle, e.g. a magnetically supported vehicle, cooperates with a reaction rail along a track for propulsion of the vehicle. According to the invention, the core of the stator comprises a pocketed frame-like or grid structure of non-magnetic material in the pockets of which sheet stacks of electrical steel are received, the central compartment or pocket serving as a cooling compartment through which a liquid coolant can be circulated. The reaction rail can partly enclose the stator.

6 Claims, 3 Drawing Figures

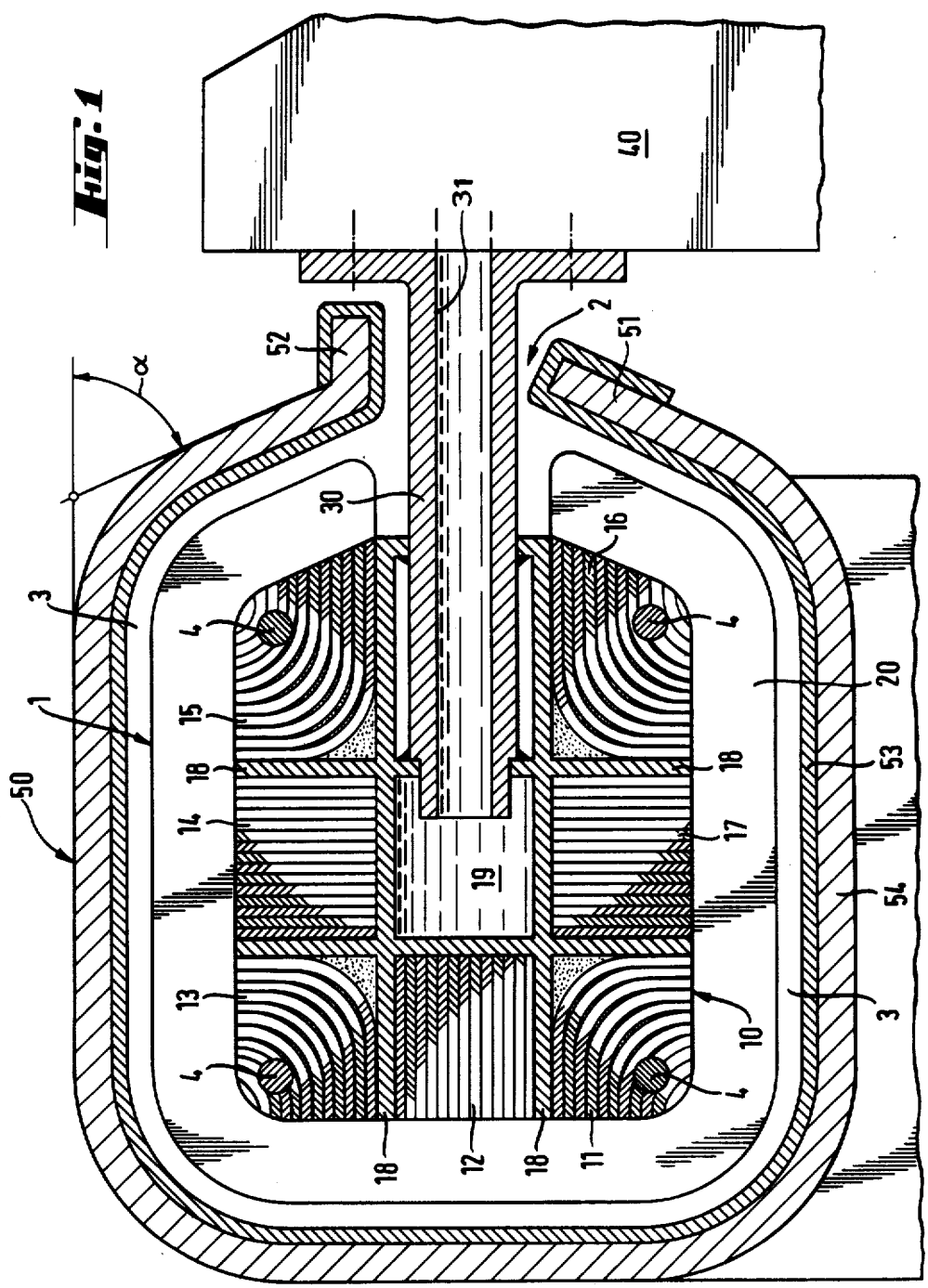

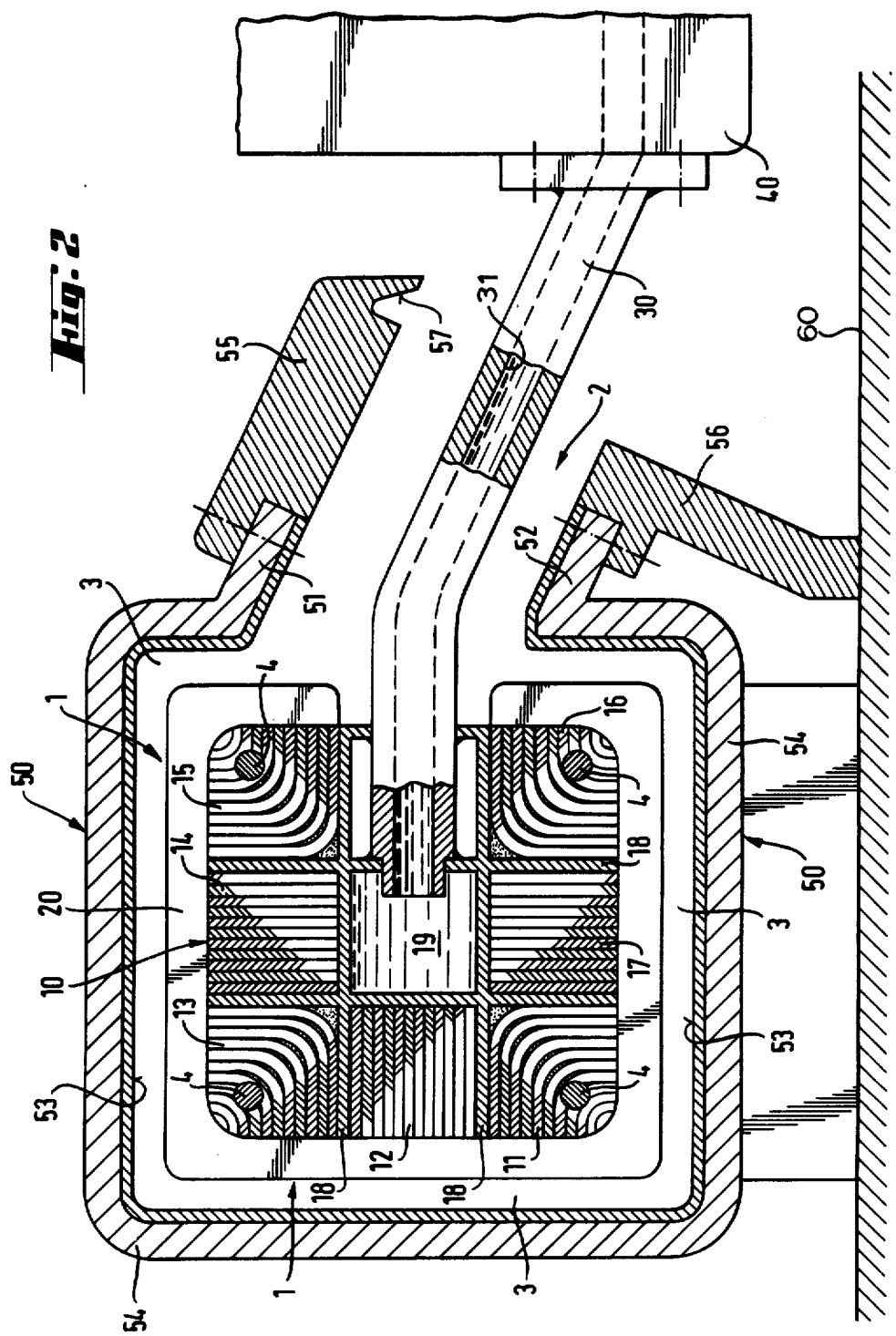

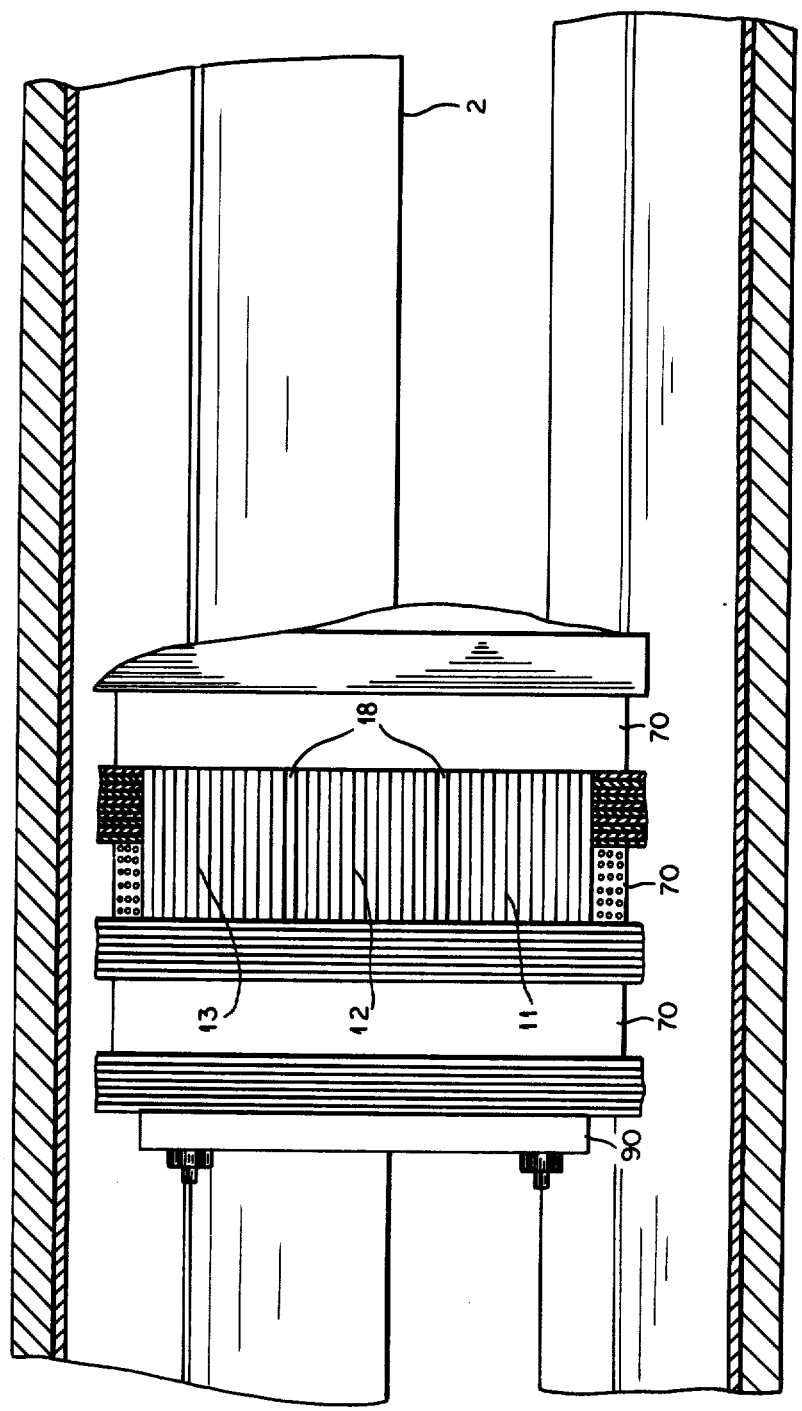

ASYNCHRONOUS LINEAR ELECTRIC MOTOR

FIELD OF THE INVENTION

The present invention relates to asynchronous linear electric motors and, more particularly, to an electric motor of the type in which a stator of limited length, provided with a magnetic coil and a core formed by sheet stacks of electrical sheet metal, cooperates with a reaction rail so that one of the two members is propelled relative to the other.

The invention also relates to vehicle propulsion systems using asynchronous linear electric motors and, more particularly, to magnetically suspended high-speed vehicle systems for this purpose.

BACKGROUND OF THE INVENTION

Linear electric motors have found increasing importance in recent years for the substantially linear propulsion of vehicles relative to stationary track structures, e.g. for the propulsion of a magnetically suspended vehicle along a track from or upon which the vehicle is magnetically supported with a minimum of friction. Such motors can be used for other purposes, however, and such purposes are included within the field of application of the linear electric motor of the present invention.

For a better understanding of magnetically supported or suspended vehicles and of propulsion by electromagnetic means, preferably by linear electric motors, reference may be had to the following U.S. Pat. Nos.: 3,780,668, 3,797,403, 3,804,022, 3,842,748, 3,804,997, 3,865,043, 3,820,472, 3,842,747, 3,851,594, 3,842,749, 3,911,828, 3,895,585 and 3,967,561.

In general, a track structure for such vehicles comprises at least one pair of rails with which electromagnets on the vehicle cooperate so that a predetermined air gap is maintained between the electromagnets and the rails with the magnetic forces being controlled to maintain the gap constant with changes in vehicle loading, for providing electromagnetic centering or guidance of the vehicle, and even for effecting the diversion of the vehicle onto spurs or branch tracks.

It has been found to be advantageous to propel such vehicles with linear electric motors and such electric motors can be of the type described in the aforementioned patents or literature referred therein or of record in the files thereof although a particularly preferred motor system, i.e. a so-called compact motor, is described in German patent No. 22 64 293.

Other motor systems which may be of interest are those described in German patent documents 22 02 027, 21 42 452, 28 11 445 and 23 65 877.

While the linear electric motors of these latter systems have elements in common with that of German patent No. 22 64 293, a discussion of the art will confine itself to the latter patent since the invention begins where this system leaves off.

It is known from German Pat. No. 22 64 293 to provide an asynchronous linear electric motor for the purposes described, which comprises a stator displaceable along a reaction rail and provided with an electromagnetic coil which is energized to induce eddy currents in the reaction rail which, in turn, produce traveling magnetic fields cooperating with the electromagnet formed by the stator to propel the stator along the rail and the vehicle along with this stator.

This motor is referred to as a compact motor because the stator is assembled from stator stacks of electrical sheet which are spaced apart along the linear dimension of the elongated stator which is enclosed on three sides by the reaction rail. The reaction rail, in turn, can comprise a ferrous-metal structure or core which is internally coated or covered by a material of high electrical conductivity juxtaposed with the rectangular section stator.

The rail opens at one side of its rectangular cross section toward the vehicle and the stator extends inwardly from the vehicle through this side.

The U-section reaction rail thus encloses the stator in part while the stator is formed with a two-part stator sheet stack which is enclosed in an annular coil. Between the individual windings of the coil, which lie in planes perpendicular to the direction of displacement of the stator and are spaced apart along the axis thereof, are disposed sheet stacks of a comb-like array. When the U-shaped core of the reaction rail is composed of iron, the conductive coating may be composed of aluminum.

The annular coil of this linear motor is energized with alternating current to generate a traveling field in the stator moving along in the longitudinal direction with synchronous speed.

This field induces across the air gap between the stator and the reaction rail, a magnetic field perpendicular to the latter which, in turn, produces eddy currents in the conductive layer of the reaction rail whose magnetic fields react with those of the stator to propel the stator along the reaction rail.

The two-part construction of the stator core sheet packs or stacks of this prior art arrangement has a first stack section perpendicular to the shanks of the U-section rail while the second portion of the sheet stack is perpendicular to the web bridging these shanks. The two sheet stacks are connected together and are enclosed by a common coil, forming a core therefor.

This orientation of the sheet stacks ensures that the magnetic fields passing through the reaction rail will be closed through the U-shaped magnetically permeable member thereof, thereby increasing the efficiency.

Notwithstanding the fact that a compact motor of the latter type has been found to be highly efficient from an electric, magnetic and propulsion viewpoint, some problems have been encountered because the stiffness of the two-part stator sheet stack and hence its mechanical stability, was less than desired and, more particularly, was less than that of a single-part sheet stator.

Thus structural problems prevented widespread usage of the principles of the compact linear motor described in German patent No. 22 64 293.

OBJECTS OF THE INVENTION

It is the principal object of the present invention to provide an improved asynchronous linear electric motor for the purposes described whereby the disadvantages discussed above are obviated.

Another object of the invention is to provide a compact linear motor having improved mechanical stability for the stator.

It is also an object of this invention to provide a linear electric motor having high stator stability as well as high electric efficiency.

SUMMARY OF THE INVENTION

These objects and others which will become apparent hereinafter are attained, in accordance with the present invention, in an asynchronous electric motor whose stator comprises a plurality of spaced-apart sheet stacks forming a comb array, and annular coils surrounding the stator stack and disposed between the latter stacks of the comb array, the stator being displaceable in a reaction rail which at least partly encloses the stator and comprises an inner electrically conductive layer on an outer magnetically permeable member. According to the invention, the stator core is formed with a multipocketed frame-like support structure or grid of nonmagnetic material which is connected to the vehicle and receives in the pockets, the individual sheet stacks forming the stator core surrounded by the coils.

The reference herein to sheet stacks will, of course, serve to designate the stacks of planar or bent electrical steel sheet commonly used in cores of transformers and the like. The frame structure of the invention preferably has a plurality of pockets surrounding a central pocket, the stacks being disposed in these outer pockets while the central pocket can serve as a passage for a cooling fluid.

Advantageously, the grid, in cross section, has the configuration of a tic-tac-toe square with the stacks at the corners thereof being composed of bent sheet so that portions of each sheet lie perpendicular to the surface of the reaction rail with which the respective side of the stator is juxtaposed. The sheets of each stack may be cemented together.

According to another feature of the invention, the coolant is circulated through the central compartment by ducts formed as support arms whereby the stator is connected to the vehicle and it has been found to be advantageous to bend the free ends of the reaction rail toward these arms and the vehicle so that only a relatively narrow window is provided and the stator is practically enclosed on all four sides.

The arms themselves can be inclined to the horizontal and the free ends of the reaction rail defining the window or the slot can extend parallel to the bent portions of the arms.

The sheet stacks can be cemented into the support frame and the result is an extraordinarily stiff structure which has a high mechanical stability approaching that of a one-piece sheet stack.

The bent arrangement of the sheets at the corners has been found to greatly improve the magnetic characteristics of the motor so that losses are minimized.

BRIEF DESCRIPTION OF THE DRAWING

The above and other objects, features and advantages of the present invention will become more readily apparent from the following description, reference being made to the accompanying drawing in which:

FIG. 1 is a cross section taken perpendicular to the longitudinal axis of a linear asynchronous motor according to the invention;

FIG. 2 is a similar section through a second embodiment thereof; and

FIG. 3 is a fragmentary section taken in the plane of this axis through a portion of the motor of FIG. 2.

SPECIFIC DESCRIPTION

In the description that follows, reference may be had to corresponding elements in the two embodiments (FIGS. 1 and 2) and these corresponding elements have been designated with the same reference numerals.

FIG. 1 shows a linear motor for propelling a vehicle 40, e.g. of the magnetically suspended type described previously. This vehicle is displaceable along a track represented generally at 60 (see FIG. 2) and upon which a reaction rail 50 is mounted.

Support arms 30 connect the stator of the motor, represented generally at 1 to the vehicle body.

The stator is axially elongated, i.e. is horizontally elongated in the plane of the section of FIG. 3 and in the direction of travel of the vehicle.

The reaction rail 50 encloses the stator 1 substantially on all sides, leaving open only a narrow slit or window 2 in the direction of the vehicle and through which the support arms 30 can pass. The stator coils are represented at 70 (see FIG. 3) and have not been shown in FIGS. 1 and 2, although they are interdigitated with a comb-like array of sheets 20 surrounding the stator core 10 (see German patent No. 22 64 293).

The free ends 51 and 52 of the reaction rail, defining the slit 2 in the embodiment of FIG. 1, are inclined to the horizontal at angles α which can be less than 90° and preferably are about 65°, the reaction rail 50 having otherwise a substantially U-shaped cross section.

The reaction rail 50 comprises an iron core and an inwardly disposed layer 53 of high electrical conductivity and composed, for example, of aluminum or copper. This layer 53, in the region of the free ends 51 and 52 is bent around these ends toward the exterior.

The air gap 3 of substantially uniform width, is formed between the conductive layer 53 and the stator 1, this gap being traversed by the traveling field which propels the stator and thus the vehicle along the track.

The core 10 of the stator is formed from a plurality of stator stacks and is of generally rectangular parallelepipedal configuration being surrounded by the coils 70 and the sheet stacks 20 forming interfitting toothed arrays.

Each stack 20 between a pair of coils, lies in a plane perpendicular to the direction of movement of the motor, i.e. in a plane perpendicular to the plane of the paper in FIG. 3 but parallel to the plane of the paper in FIG. 1. The sheets of this stack can be conventional dynamo sheets and can be cemented together.

The stator core 20, in turn, comprises a multiplicity of sheet stacks 11 through 17 in a frame or honeycomb grid support structure which preferably, as shown in FIGS. 1 and 2, has the configuration, in cross section, of a tic-tac-toe diagram. The frame 18 thus has a fully enclosed central compartment 19 surrounded by eight outer compartments of which seven lie along the corners and sides of the frame fronting the shanks and web of the generally U-section rail.

The support arms 30 pass through the eighth compartment and open into the central compartment 19 at axially spaced locations, being formed with passages 31 through which a cooling fluid can be circulated through the compartment 19.

The coolant can be a circulated gas or liquid.

Stacks 11, 13, 15 and 16, disposed in the corner pockets, are bent so that the portions of the sheets turned toward the respective shank or web of the rail lie perpendicular thereto.

At the axial ends of the stator 1, plates are provided as shown at 90 so that draw bolts 4 can hold these plates together and form a stable structure therefor. The bolts 4 traverse the stacks 11, 13, 15 and 16 at the corners.

The stacks 11 through 17 are so layered that their layering directions are adapted to the traveling field traversing the air gap. Thus the layers of the stack 12 lie perpendicular to the plane of the web of the reaction rail while the layers of stacks 14 and 17 lie perpendicular to the planes of the upper and lower shanks, respectively, and at each corner, the bent sheets can be perpendicular to both a shank plane or a web plane.

The sheets of each stack can be adhesively bonded together.

The stacks 11, 13, 15 and 16 can be formed by bending successive layers on a rectangular-section mandrel and then slicing the stacks from this mandrel.

The stacks are also cemented into the pockets or compartments of the support frame 18, thereby resulting in a highly stable structure having a minimum of losses.

The embodiment of FIG. 2 differs from that of FIG. 1 in that the arms 30 are inclined upwardly and the free ends of the reaction rail defining the slit 2 are formed with an overhang 55 and a lower extension 56, respectively. The latter member can run down to the track while the overhang 55 can be formed with a drip edge shielding the interior of the rail against water droplets. The overhang 55 provides a rain shield parallel to the inclined portion of the support arm 30 while the lower member 56 forms a splash shield. Members 55 and 56 can be composed of the same material as the conductive layer 53 and can form one piece therewith.

I claim:

1. An asynchronous linear motor comprising:
   a reaction rail of generally U-shaped cross section having an inner conductive layer and opening at one side of said rail while extending along a path; and
   a stator receivable in said rail and defining an air gap therewith whereby a traveling magnetic field across said gap displaces said stator relative to said rail along said path, said stator comprising:
      a stator core elongated in the direction of said path,
      a comb-like array of outer sheet stacks surrounding said core and spaced apart therealong while lying in planes perpendicular to said path, and
      respective coils surrounding said core and disposed between the outer sheet stacks of said array, said core comprising:
         a multipocketed grid-shaped frame of non-magnetic material connectable to a load and supporting said stator, said frame having pockets confronting the shanks and web of said rail, and
         respective inner core sheet stacks received in said pockets.

2. The motor defined in claim 1 wherein said frame is formed with a central pocket, said stator being provided with hollow arms communicating with said central compartment and extending through the open side of said reaction rail for connecting said stator to said load and passing a coolant through said central compartment.

3. The motor defined in claim 2 wherein said frame has the configuration in cross section of a tic-tac-toe pattern with corner pockets and side pockets surrounding said central compartment, said corner pockets and said side pockets receiving respective inner sheet stacks, the inner sheet stacks of said corner pockets being assembled of sheets bent substantially at right angles and cemented in said corner pockets.

4. The motor defined in claim 1, claim 2 or claim 3 wherein said reaction rail has free ends at said open side inclined toward one another away from the shanks of said reaction rail.

5. The motor defined in claim 1, claim 2 or claim 3 wherein said reaction rail has free ends including an upper end formed with a rain shield having a drip edge and a lower end having a downwardly extending rain shield.

6. The motor defined in claim 3 wherein said arms are inclined and said reaction rail has free ends extending parallel to the inclined arms.

* * * * *